United States Patent
Cui

(10) Patent No.: US 9,268,324 B2
(45) Date of Patent: Feb. 23, 2016

(54) REMOTE OPERATION RECEIVING SYSTEM, REMOTE OPERATING SYSTEM AND PROGRAM THEREOF

(71) Applicant: Neusoft Corporation, Shenyang (CN)

(72) Inventor: Hua Cui, Tokyo (JP)

(73) Assignee: NEUSOFT CORPORATION (CN)

( * ) Notice: Subject to any disclaimer, the term of this patent is extended or adjusted under 35 U.S.C. 154(b) by 0 days.

(21) Appl. No.: 14/518,929

(22) Filed: Oct. 20, 2014

(65) Prior Publication Data
US 2015/0112485 A1 Apr. 23, 2015

(30) Foreign Application Priority Data
Oct. 23, 2013 (JP) .................................. 2013-220216

(51) Int. Cl.
*G05B 19/406* (2006.01)
*G05B 23/02* (2006.01)
(52) U.S. Cl.
CPC .......... *G05B 19/406* (2013.01); *G05B 23/0208* (2013.01)
(58) Field of Classification Search
CPC ........................... G05B 19/406; G05B 23/0208
See application file for complete search history.

(56) References Cited

U.S. PATENT DOCUMENTS

| 5,483,231 A * | 1/1996 | Sasabe | G08C 25/00 340/12.22 |
| 2010/0023156 A1* | 1/2010 | Trepina | G05B 19/406 700/175 |
| 2011/0057812 A1* | 3/2011 | Matsuda | G05B 19/406 340/870.07 |
| 2013/0131883 A1* | 5/2013 | Yamada | H02J 3/14 700/295 |

FOREIGN PATENT DOCUMENTS

JP H08-108387 A 4/1996

\* cited by examiner

*Primary Examiner* — Nicholas Kiswanto
(74) *Attorney, Agent, or Firm* — Hauptman Ham, LLP

(57) ABSTRACT

The present invention relates to a remote operation receiving system, for suppressing the generation of the executive results of the action which don't meet the operating aim. The host unit of a local server may enable a target equipment to perform the corresponding action according to a remote operation instruction received from a remote operating device (S400). Based on the history data, the condition variation in the target equipment generated between the operation reference timing to the current timing is detected (S320~S345). The operation reference timing refers to the time point when the condition displayed on the screen in a distant device is monitored from the monitoring device when the distant operating device is operated. If the condition variation is relatively large, then the remote operation instruction is abandoned (S430), and if smaller, then the target equipment performs the action to which the remote operation instruction corresponds (S400).

8 Claims, 9 Drawing Sheets

| | | | | the first sensor | the second sensor | | the third sensor | | the fourth sensor | |
|---|---|---|---|---|---|---|---|---|---|---|
| ... | | | | | | | | | | |
| ID1 | the taken-photographs by the first camera | the taken-photographs by the second camera | ... | the first sensor : OFF | the second sensor : ON | ... | the third sensor : OFF | ... | the fourth sensor : OFF | ... |
| ID2 | the taken-photographs by the first camera | the taken-photographs by the second camera | ... | the first sensor : ON | the second sensor : OFF | ... | the third sensor : OFF | ... | the fourth sensor : OFF | ... |
| ID3 | the taken-photographs by the first camera | the taken-photographs by the second camera | ... | the first sensor : ON | the second sensor : OFF | ... | the third sensor : OFF | ... | the fourth sensor : OFF | ... |
| ID4 | the taken-photographs by the first camera | the taken-photographs by the second camera | ... | the first sensor : ON | the second sensor : OFF | ... | the third sensor : OFF | ... | the fourth sensor : OFF | ... |
| ID5 | the taken-photographs by the first camera | the taken-photographs by the second camera | ... | the first sensor : OFF | the second sensor : ON | ... | the third sensor : OFF | ... | the fourth sensor : OFF | ... |
| ID6 | the taken-photographs by the first camera | the taken-photographs by the second camera | ... | the first sensor : OFF | the second sensor : ON | ... | the third sensor : OFF | ... | the fourth sensor : OFF | ... |
| ID7 | the taken-photographs by the first camera | the taken-photographs by the second camera | ... | the first sensor : OFF | the second sensor : ON | ... | the third sensor : OFF | ... | the fourth sensor : OFF | ... |
| ID8 | the taken-photographs by the first camera | | | the first sensor : OFF | the second sensor : OFF | ... | the third sensor : OFF | ... | the fourth sensor : OFF | ... |
| ... | | | | | | | | | | | the operation reference timing → pre-performing, performing

| | | the first sensor | | the second sensor | | the third sensor | | the fourth sensor | |
|---|---|---|---|---|---|---|---|---|---|
| ... | ... | ... | | ... | | ... | | ... | |
| ID 1 | the taken-photographs by the first camera | the taken-photographs by the second camera | the first sensor | OFF | the second sensor | ON | the third sensor | OFF | the fourth sensor | OFF |
| ID 2 | the taken-photographs by the first camera | the taken-photographs by the second camera | the first sensor | ON | the second sensor | OFF | the third sensor | OFF | the fourth sensor | OFF |
| ID 3 | the taken-photographs by the first camera | the taken-photographs by the second camera | the first sensor | ON | the second sensor | OFF | the third sensor | OFF | the fourth sensor | OFF |
| ID 4 | the taken-photographs by the first camera | the taken-photographs by the second camera | the first sensor | ON | the second sensor | OFF | the third sensor | ON | the fourth sensor | OFF |
| ID 5 | the taken-photographs by the first camera | the taken-photographs by the second camera | the first sensor | ON | the second sensor | OFF | the third sensor | ON | the fourth sensor | OFF |
| ID 6 | the taken-photographs by the first camera | the taken-photographs by the second camera | the first sensor | ON | the second sensor | OFF | the third sensor | ON | the fourth sensor | OFF |
| ID 7 | the taken-photographs by the first camera | the taken-photographs by the second camera | the first sensor | ON | the second sensor | OFF | the third sensor | ON | the fourth sensor | OFF |
| ID 8 | the taken-photographs by the first camera | the taken-photographs by the second camera | the first sensor | ON | the second sensor | OFF | the third sensor | ON | the fourth sensor | OFF |
| ... | ... | ... | | ... | | ... | | ... | | the operation reference timing pre-performing → performing

| | the taken-photographs by the first camera | the taken-photographs by the second camera | ... | the first sensor | | the second sensor | | ... | the third sensor | | the fourth sensor | | ... |
|---|---|---|---|---|---|---|---|---|---|---|---|---|---|
| ID 1 | the taken-photographs by the first camera | the taken-photographs by the second camera | | the first sensor | ON | the second sensor | OFF | | the third sensor | OFF | the fourth sensor | OFF | |
| ID 2 | the taken-photographs by the first camera | the taken-photographs by the second camera | | the first sensor | ON | the second sensor | OFF | | the third sensor | OFF | the fourth sensor | OFF | |
| ID 3 | the taken-photographs by the first camera | the taken-photographs by the second camera | | the first sensor | OFF | the second sensor | ON | | the third sensor | OFF | the fourth sensor | OFF | |
| ID 4 | the taken-photographs by the first camera | the taken-photographs by the second camera | | the first sensor | OFF | the second sensor | OFF | | the third sensor | ON | the fourth sensor | OFF | |
| ID 5 | the taken-photographs by the first camera | the taken-photographs by the second camera | | the first sensor | OFF | the second sensor | OFF | | the third sensor | ON | the fourth sensor | OFF | |
| ID 6 | the taken-photographs by the first camera | the taken-photographs by the second camera | | the first sensor | OFF | the second sensor | OFF | | the third sensor | ON | the fourth sensor | OFF | |
| ID 7 | the taken-photographs by the first camera | the taken-photographs by the second camera | | the first sensor | OFF | the second sensor | OFF | | the third sensor | OFF | the fourth sensor | ON | |
| ID 8 | the taken-photographs by the first camera | the taken-photographs by the second camera | | the first sensor | OFF | the second sensor | OFF | | the third sensor | OFF | the fourth sensor | ON | | the operation reference timing → ID 2 pre-performing → ID 5
performing postponed

| | the taken-photographs by the first camera | the taken-photographs by the second camera | ... | illumination | the oscillation amount of the solar panel | ... |
|---|---|---|---|---|---|---|
| ... | | | | | | |
| ID1 | the taken-photographs by the first camera | the taken-photographs by the second camera | ... | illumination : X1 | the oscillation amount of the solar panel : Y1 | ... |
| ID2 | the taken-photographs by the first camera | the taken-photographs by the second camera | ... | illumination : X2 | the oscillation amount of the solar panel : Y2 | ... |
| ID3 | the taken-photographs by the first camera | the taken-photographs by the second camera | ... | illumination : X3 | the oscillation amount of the solar panel : Y3 | ... |
| ID4 | the taken-photographs by the first camera | the taken-photographs by the second camera | ... | illumination : X4 | the oscillation amount of the solar panel : Y4 | ... |
| ID5 | the taken-photographs by the first camera | the taken-photographs by the second camera | ... | illumination : X5 | the oscillation amount of the solar panel : Y5 | ... |
| ID6 | the taken-photographs by the first camera | the taken-photographs by the second camera | ... | illumination : X6 | the oscillation amount of the solar panel : Y6 | ... |
| ID7 | the taken-photographs by the first camera | the taken-photographs by the second camera | ... | illumination : X7 | the oscillation amount of the solar panel : Y7 | ... |
| ID8 | the taken-photographs by the first camera | the taken-photographs by the second camera | ... | illumination : X8 | the oscillation amount of the solar panel : Y8 | ... |
| ... | | | | | | | the operation reference timing → pre-performing

REMOTE OPERATION RECEIVING SYSTEM, REMOTE OPERATING SYSTEM AND PROGRAM THEREOF

CROSS REFERENCE TO RELATED APPLICATION

This application claims the priority of Japanese Patent Application No. 2013-220216, filed on Oct. 23, 2013 in the Japan Patent Office, and all the benefits accruing therefrom under 35 U.S.C. §119. The contents of the above-listed patent application in their entirety are herein incorporated by reference.

TECHNICAL FIELD

The invention relates to a remote operation receiving system for receiving remote operation instructions to enable a target equipment to perform corresponding actions, a remote operating system provided with the system, and a program enabling a computer to implement at least some of the functions which the system can provide.

BACKGROUND ART

In the past, a system for controlling a device according to the commands from a user is known. For example, a remote operating system for a robot is known for easily enabling the robot provided remotely to operate safely and accurately (for example, see the patent document 1).

According to the system, the action instructions (the operation instructions) are sent to the control device of the robot by a device on the user side based on the commands from the user. On the other hand, the real condition of the robot delivered by the control device of the robot is displayed by the device on the user side. Further, the condition of the robot before the communication delay is presumed and displayed by the device on the user side, so that the robot provided remotely can operate effectively as expected by the user.

TECHNICAL DOCUMENT IN PRIOR ART

Patent Document

Patent Document 1: The Japanese Patent Laid-Open Publication No. 8-108387

SUMMARY

Technical Problem

However, in the system for operating (controlling) remotely the target equipment such as vehicles, robots based on the communication, due to the communication delay, the time delay will be generated from when the target equipment is started to be controlled by the control device adjacent to the target equipment according to the operation instruction from the remote device on the user side to when the control results are displayed by the device on the user side. Further, the time delay will be generated from when the operation instruction is initially sent to the control device from the device on the user side according to the command from the user to when the target equipment is controlled to perform the action to which the said operation instruction corresponds by the control device.

According to the aforementioned prior art, the impact caused by the time delay can be relieved by presuming the condition of the target equipment and displaying the presumed results, however, because there are errors contained in the presumed results, which may cause the user to perform the remote operation on the target equipment based on the wrong knowledge of the current condition.

In addition, if the time delay is longer, then sometimes, there is a big difference between the condition of the target equipment identified by the user when the remote operation is performed and the condition of the target equipment when the action to which the remote operation instruction corresponds is performed. In this case, the executive results meeting the user's operating aim can't be generated, even if the action to which the remote operation instruction corresponds is performed by the target equipment.

The invention is proposed in view of the above problems, and the aim in that is to provide a technical solution, which can prevent the generation of the executive results which don't meet the operating aim, caused by the time delay before the action to which the remote operation instruction corresponds is performed by the target equipment.

Solution to Problem

The remote operation receiving system includes a receiving unit, a sending unit, a detecting unit and a control unit. The receiving unit receives a remote operation instruction for the target equipment from an external device. The sending unit generates the provided data provided to the external device indicating the condition of the target equipment according to the monitoring data from a monitoring device, and sends the provided data to the external device sequentially. The monitoring device referred to here is the device for monitoring at least one of the target equipment and the surroundings of the target equipment and outputting the monitoring data indicating the monitoring results. The external device sends the remote operation instruction to the remote operation receiving system and displays the condition of the said target equipment according to the provided data received from the remote operation receiving system. The condition referred to here should be construed in a broader way, involving the environment in which the target equipment is located, that is, the surrounding circumstance (atmosphere) of the target equipment, and the condition of the target equipment itself. In addition, when the target equipment is the device for enabling some functions to the target object such as a robot's arm for clamping and handling a target object, the condition of the target equipment may also include the condition of the said target object controlled by the target equipment, and the correspondence between the target equipment and the target object.

The detecting unit detects the condition variation in the target equipment generated between the pre-performing timing and the operation reference timing according to the monitoring data from the monitoring device, the pre-performing timing is the timing before the action to which the remote operation instruction received by the receiving unit corresponds is performed by the target equipment. The operation reference timing referred to here is the time point when the condition displayed in the screen in the remote device is monitored from the monitoring device when the remote operating device is operated.

Based on the condition variation detected by the detecting unit, if the condition variation is great than the reference, the control unit controls the target equipment not to perform the action to which the remote operation instruction corresponds, and when the condition variation is equal or less than the reference, the control unit controls the target equipment to perform the action to which the remote operation instruction corresponds.

According to the remote operation receiving system, if the condition of the target equipment identified by the user when the remote operation is performed is different from the condition of the target equipment before the action to which the remote operation instruction corresponds is performed, for example, the action to which the remote operation instruction corresponds performed by the target equipment can be postponed, prohibited or stopped.

Therefore, according to the remote operation receiving system, the generation of the executive results which don't meet the user's operating aim can be suppressed which are caused by the time delay before the action to which the remote operation corresponds is performed by the target equipment based on the remote operation, or caused by the time delay before the condition of the target equipment is displayed by the external device according to the monitoring action.

Again, to the extent that the said time delay should not be ignored, the invention can be applicable to the remote operation receiving system separated from the external device. Therefore, the remote referred to here should be construed in a broader way, and the distance between the external device and the remote operation receiving system is not defined exactly. For example, the external device and the remote operation receiving system can be connected with a communication cable which is about several meters long at most therebetween, or connected by means of the wide area network such as the Internet.

In addition, the said sending unit can be configured to send a part or all of the monitoring data from the monitoring device as the said provided data to the external device. In addition, the sending unit can be configured to process or not process the monitoring data from the monitoring device and send them as the said provided data to the external device.

In addition, the remote operation receiving system can be configured to include the accumulation unit, which is configured to store the monitoring data from the monitoring device as the history data at each timing in the storing device. In this case, the detecting unit can be configured to detect the condition variation in the target equipment referring to the history data at each monitoring timing stored in the storing unit.

In addition, the sending unit can be configured to send the provided data for the external device to the external device together with the identification code at the corresponding monitoring timing. As an example of the identification code referred to here, there is the monitoring timing itself or the data managing code which can determine the monitoring timing, and so on. In addition, the accumulation unit can be configured to store the said history data in the storing unit in the manner in which an individual identification code is added at each monitoring timing.

Corresponding to the structure of the remote operation receiving system, the external device can be configured to, if the operation of instructing to send the remote operation instruction is performed, send the remote operation instruction corresponding to the operation to the remote operation receiving system together with the information source of the condition displayed at the operation, that is, the identification code of the provided data.

In this case, the receiving unit included in the remote operation receiving system can be configured to receive the remote operation instruction and the identification code. In addition, the detecting unit can be configured to detect the condition variation in the target equipment referring to the history data at each monitoring timing stored in the storing unit, and at the same time, according to the identification code received by the receiving unit, determine the history data indicating the condition of the target equipment at the operation reference timing.

In addition, there is a camera contained in the monitoring device, for taking photographs of at least one of the target equipment and the surroundings of the target equipment, and outputting the taken-photograph data as the said monitoring data.

Then, the sending unit can be configured to send the taken-photograph data from the camera as the said provided data to the external device. In this case, the external device can be configured to display the photographs according to the taken-photograph data delivered from the remote operation receiving system. In addition, the detecting unit can be configured to detect the condition variation in the target equipment according to the taken-photograph data.

The remote operation is performed by the user according to the condition of the target equipment obtained from the taken-photograph displayed in the external device. According to the structure of the said remote operation receiving system, if to the condition of the target equipment obtained by the user at the remote operation according to the taken-photograph is different from the condition at the said performing timing, the user only needs to control the target equipment not to perform the action to which the remote operation instruction corresponds and then the action performed at the target equipment which don't meet the user's operating aim can be suppressed.

Also, as to the condition variation in the target equipment generated between the pre-performing timing and the operation reference timing, the detecting unit can be the unit for detecting the condition difference between two time points including not only the pre-performing timing and the operation reference timing, and moreover, when the conditions at each timing between the pre-performing timing and the operation reference timing are considered, the detecting unit can be the unit for detecting the condition variation occurred at each timing between the pre-performing timing and the operation reference timing.

For example, the said condition variation detected by the detecting unit can be a scalar or a vector formed by numeralizing of the difference between the value at the pre-performing timing and the value at the operation reference timing with at least one interested parameter. In addition, the varying amount in the interested parameter(s) between the pre-performing timing and the operation reference timing (for example, the accumulation value of the absolute values of varying amounts at various timings) can be numeralized through the said condition variation, and the variation magnitude and the variation rate in the interested parameter between the pre-performing timing and the operation reference timing can also be numeralized through the said condition variation.

By the way, the said condition variation can be represented by the determination if there is one or more specified events causing the condition variation of the target equipment occurred from the pre-performing timing to the operation reference timing, and also can be represented by the occurring times thereof. When the said condition variation is represented by a numerical value, the said reference used by the control unit can be represented as a threshold. On the other hand, the control unit can be configured to, determine the said condition variation to be greater than the reference if there is a specified event occurred, and determine the said condition variation to be lower than the reference if there is no specified event occurred, in which the reference is considered as the condition whether there is no specified event occurred.

In addition, the control unit can be configured to, if the condition difference between the condition of the target equipment at the pre-performing timing and the condition of the target equipment at the operation reference timing, that is, the said condition variation is greater than the reference, then before the said difference becomes equal or less than the reference, control the target equipment not to perform the action to which the remote operation instruction corresponds, and, when the said difference is equal or less than the reference, control the target equipment to perform the action to which the remote operation instruction corresponds. By the way, the control unit can be configured to, if the condition in which the said difference is greater than the reference lasts for more than a specified time, then withdraw the remote operation instruction.

If the control unit is configured to withdraw the remote operation instruction once the said difference is greater than the reference, when the communication environment between the external device and the remote operation receiving system deteriorates, or the condition variation of the target equipment is overreacted, the following inconvenience may be occurred. That is, in order to enable the target equipment to perform the action to which the remote operation instruction corresponds, the user may need to operate the external device for several times.

For this case, if the control unit is configured to be in standby before the said difference becomes equal or less than the reference, then as long as the target equipment is controlled to perform the action to which the remote operation instruction corresponds when the said difference is equal or less than the reference, the said inconvenience can be suppressed.

In addition, the function of at least one of the units included in the remote operation receiving system can be implemented through programs, by the computer of the information processing system for receiving the remote operation instruction for the target equipment from the external device. The programs enabling the computer to implement these functions can be stored in the computer readable storing medium such as the optic disc of CD-ROM and DVD, magnetic disk, and semiconductor storage.

In addition, the invention can be used in the form of including the remote operating device and the remote operating system of the said remote operation receiving system, the remote operating device characterized by the said external device.

BRIEF DESCRIPTION OF DRAWINGS

FIG. 6 is a diagram showing the first example of the history data group.

FIG. 7 is a diagram showing the second example of the history data group.

FIG. 8 is a diagram showing the third example of the history data group.

FIG. 10 is a diagram showing the fourth example of the history data group.

Figure 1:
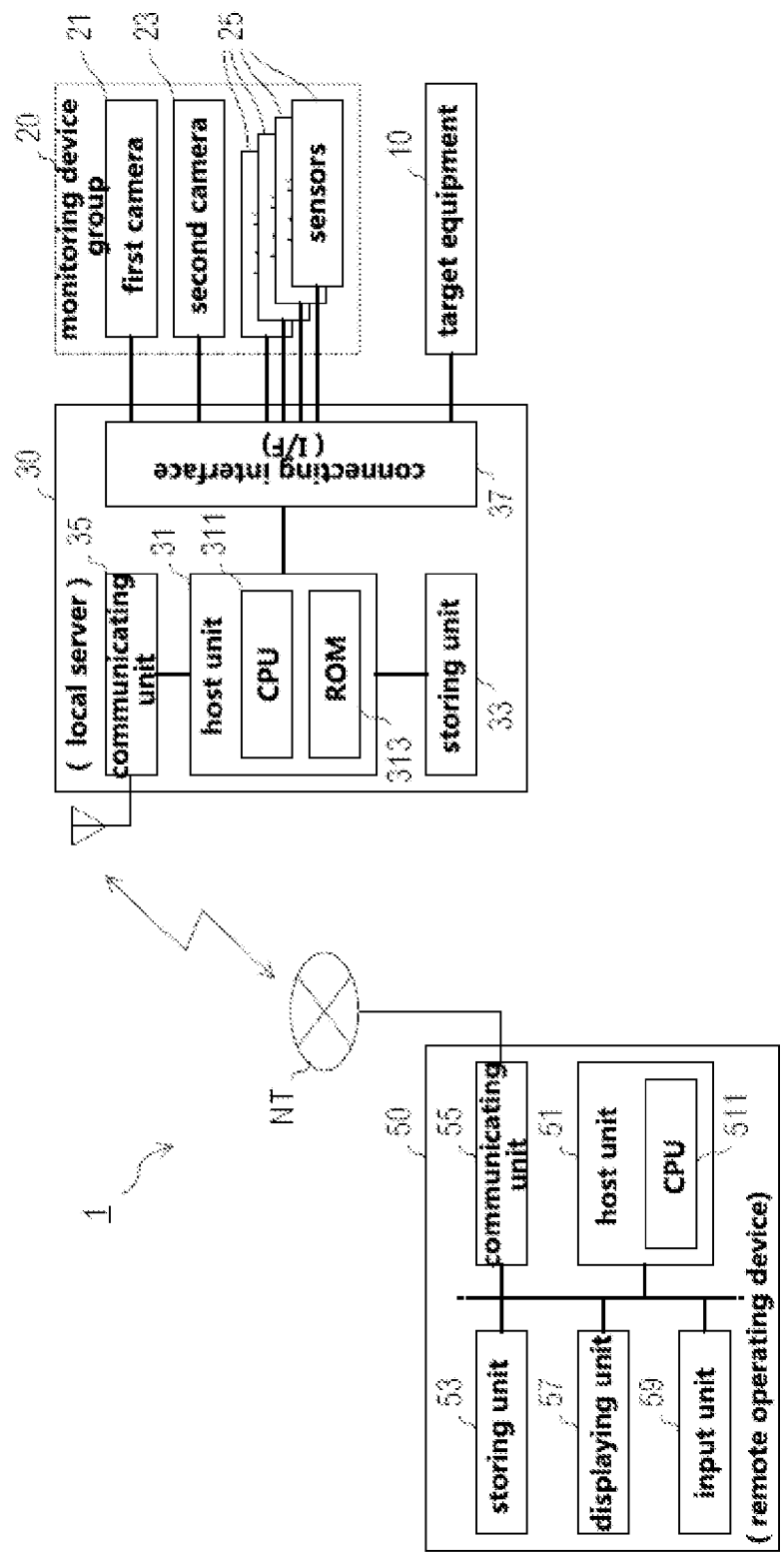
FIG. 1 is a block diagram showing the structure of a remote operating system.

| Reference Numerals | | |
|---|---|---|
| 1 remote operating system | 10 target equipment | |
| 20 monitoring device group | | |
| 21 first camera | 23 second camera | 25 sensors |
| 30 local server | 31 host unit | 33 storing unit |
| 35 communicating unit | 37 connecting interface | |
| 50 remote operating device | | |
| 51 host unit | 53 storing unit | 55 communicating unit |
| 57 displaying unit | 59 input unit | 311 CPU |
| 511 CPU | NT wide area network | |

MODE FOR THE INVENTION

Hereinafter, embodiments of the invention will be described with reference to the accompanying drawings. However, the invention is not limited to the embodiments described below, but can take various forms.

FIG. 1 is a view showing the remote operating system 1 according to the embodiment, which includes the equipment as a remote operation target (referred to as a target equipment below) 10, monitoring device group 20, local server 30 and remote operating device 50. As an example of the target equipment 10, there are mobile objects like various robots, vehicles, aircrafts, rockets and satellites, for example, the robot for industry and the robot for aerospace exploration; and devices provided in these mobile objects.

The monitoring device group 20 is consisted of a plurality of monitoring devices 21, 23 and 25 for monitoring the target equipment 10 and its surroundings. FIG. 1 shows an example of the monitoring device group 20 which includes a first camera 21, a second camera 23 and a plurality of sensors 25. As an example of the first camera 21, there is the camera for taking photographs of the target equipment 10, and as an example of the second camera 23, there is the camera for taking photographs of the surroundings of the target equipment 10.

In more detail, the first camera 21 can take photographs of the robot's arm as the target equipment 10, and the second camera 23 can take photographs of the objects handled/operated by the robot's arm. In addition, the first camera 21 can take photographs of the in-vehicle devices as the target equipment 10, and the second camera 23 can take photographs of the surroundings of the vehicle (for example, the front of the vehicle) carrying the in-vehicles devices. As an example of the target equipment 10 as the in-vehicle devices, for example, the in-vehicle devices functioned as HMI (Human Machine Interface) and taking control of the inside of the vehicle according to the user's commands can be provided in the vehicle, thereby performing remote operations (operation) remotely to the vehicle.

As an example of the plurality of sensors 25, there are the sensors for monitoring the surroundings of the target equipment 10 or the sensors for monitoring the condition of the target equipment 10. For example, there are the sensors for detecting the humidity/temperature/illumination of the surroundings of the target equipment 10, or the sensors for detecting the positions/speed/acceleration/posture/traveling direction/vibrating/swaying and so on of the target equipment 10 or the movable part thereof, or the sensors for detecting the internal temperature and so on of the target equipment 10.

The local server 30 is connected with the target equipment 10 and the monitoring device group 20 through cables or wirelessly. For example, the local server 30 is arranged in the same mobile object (vehicles, and so on) together with the target equipment 10 and the monitoring device group 20.

The local server 30 is configured to be able to not only control the target equipment 10, but also obtain the monitoring data from the monitoring devices 21, 23, 25 constituting the monitoring device group 20. As an example of the monitoring data, there are the taken-photograph data representing the taken photographs of the target equipment 10 taken by the first camera 21, the taken-photograph data representing the taken photographs of the surroundings of the target equipment 10 taken by the second camera 23, and the detected values of the physical quantities detected by sensors 25.

FIG. 1 shows the local server 30 which includes a host unit 31, a storing unit 33, a communicating unit 35 and a connecting interface 37. The host unit 31 mainly includes a CPU 311, a ROM 313 for storing various programs, and a RAM not shown. The CPU 311 implements the functions which the local server 30 can provide by performing the actions based on the programs stored in the ROM 313.

The storing unit 33 is an auxiliary storing device consisted of flash disk or hard disk devices, and so on (in other words, a non-volatile storing device, the data onto which can be rewritten electronically), used to store the data or setting information, and so on generated by the CPU 311 when performing actions.

The communicating unit 35 is controlled by the host unit 31, implementing communications with the remote operating device 50 by means of the wide area network NT, for example, which is consisted of the wireless communicating units such as the cellular communicating unit or WiFi communicating unit. The connecting interface 37 is connected to the target equipment 10 and the monitoring device group 20 for forwarding the signals received and sent between the target equipment 10 along with the monitoring device group 20, and the host unit 31.

On the other hand, the remote operating device 50 is provided remotely, far away from the target equipment 10 and subject to the operations from users. For example, the remote operating device 50 is constructed by installing the programs for implementing the functions of the remote operating device 50 in a well-known personal computer.

FIG. 1 shows the remote operating device 50 which includes a host unit 51, a storing unit 53, a communicating unit 55, a displaying unit 57 and an input unit 59. The host unit 51 mainly includes a CPU 511, and a ROM and a RAM not shown, implementing the functions which the remote operating device 50 can provide by performing the actions based on various programs in the CPU 511. These programs are stored in the storing unit 53, which is an auxiliary storing device consisted of flash disk or hard disk devices, and so on.

The communicating unit 55 is controlled by the host unit 51, implementing the communication with the local server 30 by means of the wide area network NT. The displaying unit 57 is consisted of a liquid crystal display, and so on, and controlled by the host unit 51, displaying the user-oriented information screen. In addition, the input unit 59 is consisted of pointers such as a mouse, a touch screen, or user operable equipment such as a keyboard, inputting operation information (commands) from users to the host unit 51.

Next, the description of the storage sending action performed by the host unit 31 of the local server 30 will be made with reference to FIG. 2. Hereinafter, the actions performed by the CPU 31 will be described, regarding the host unit 31 as the acting body for the purpose of description. Likewise, the actions performed by the CPU 511 will be described, regarding the host unit 51 as the acting body.

Figure 2:
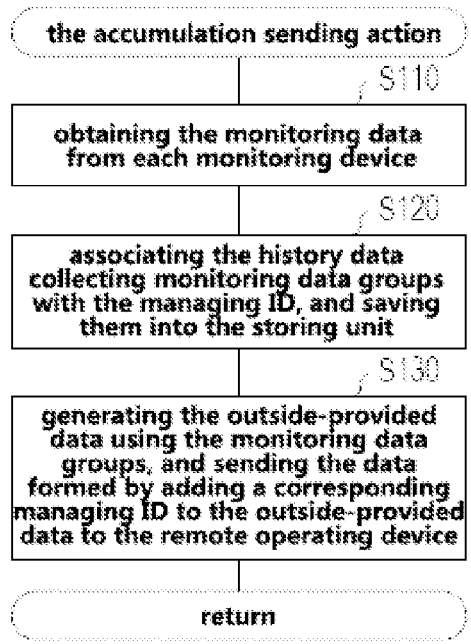
FIG. 2 is the flow chart showing the storage sending action performed by the host unit of the local server.

The storage sending action shown in FIG. 2 is performed at each predetermined sampling period by the host unit 31. Once the storage sending action starts, the host unit 31 obtains the monitoring data output from the monitoring devices 21, 23, 25 which are connected to the connecting interface 37 (Step S110). The set of monitoring data obtained at the step S110 represents the condition of the target equipment 10 monitored at this timing. As far as the scope of the condition of the target equipment 10 referred to here, in addition to the surroundings (atmosphere), it also includes the condition of the target equipment 10 itself.

Then, the history data generated after the monitoring data from each monitoring device obtained at the step S110 is collected will be associated with the managing ID and registered into the history database of the storing unit 33 by the host unit 31 (S120). Here, the history database is a database registered with the history data at each monitoring timing by associating them with individual managing IDs.

When the action of the step S120 is completed, the host unit 31 generates the outside-provided data provided to the remote operating device 50 according to the monitoring data obtained from each monitoring device at the step S110, adds a corresponding managing ID to the outside-provided data to form communicating data, and sends the communicating data to the remote operating device 50 through the communicating device 35 (Step S130).

At the step S130, the outside-provided data which contains a part or all of the monitoring data from each monitoring device obtained at the step S110 is generated, and can be sent to the remote operating device 50. The outside-provided data can be the data containing the monitoring data itself output from the monitoring devices 21, 23, 25, or the data containing the processed version of the monitoring data or the information extracted from the monitoring data. For example, the host unit 31 can generate the outside-provided data which contains the parameter values representing the condition of the target equipment 10 generated by parsing the monitoring data. In the following, the parameters representing the condition of the target equipment 10 are referred to as condition parameters.

In more detail, at the step S130, the outside-provided data can be sent, which contains only the taken-photograph data by the first camera 21 and the second camera 23 among the taken-photograph data by the first camera 21 and the second camera 23 and the detected values of sensors 25 which are obtained at the step S110 as the monitoring data. As another example, at the step S130, the outside-provided data can be sent which contains all of the taken-photograph data by the first camera 21 and the second camera 23 and the detected values of sensors 25 which are obtained at the step S110 as the monitoring data.

In addition, the outside-provided data containing the position of a taken object generated by parsing the taken-photograph data as the above-mentioned condition parameter can be sent by the host unit 31. For example, when the target equipment 10 is a robot's arm, the outside-provided data containing the relative position of the target object handled by the robot's arm with respect to the robot's arm as the above-mentioned condition parameter can be sent.

The host unit 31 adds an individual managing ID to the history data at each monitoring timing and saves them into the storing unit 33 by performing the actions of the steps S110~S130 at each sampling period, thereby storing the history data at each monitoring timing into the storing unit 33. The managing ID can be the data representing the monitoring timing, such as day, hour, minute and second, or the reference numerals for counting every time recording the history data. The managing ID can be any identification code which can determine the relationship of the monitoring timings between the history data.

Figure 3:
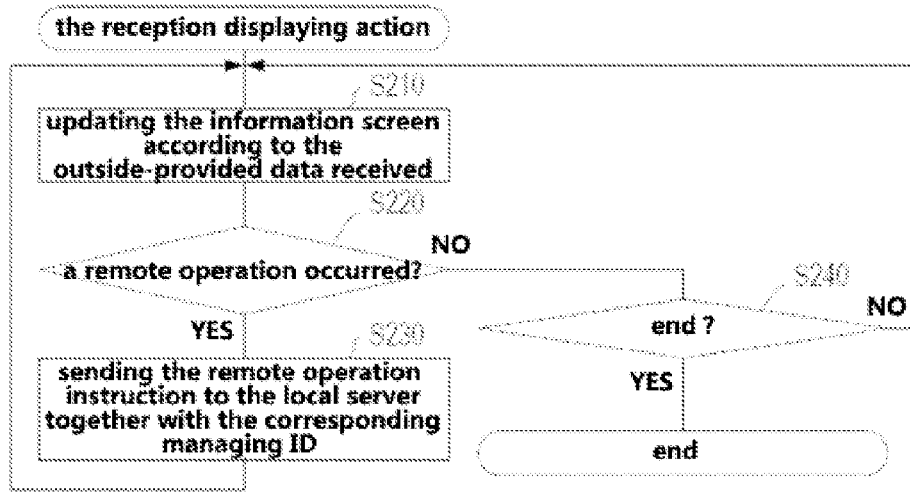
FIG. 3 is the flow chart showing the reception displaying action performed by the host unit of the remote operating device.

Next, the description of the action for receiving the communicating data including the outside-provided data and the managing ID by the remote operating device 50 will be made with reference to FIG. 3. Once the executive instruction for the reception displaying action is input by the input unit 59, the host unit 51 (in more detail, the CPU511) performs the reception displaying action shown in FIG. 3.

Once the reception displaying action starts, the host unit 51 performs the updating operation of the information screen (Step S210). In more detail, at the step S210, it determines whether the communicating unit 55 receives new outside-provided data from the local server 30, and if the new outside-provided data is received, then the information screen displayed by the displaying unit 57 is updated, so that the latest condition of the target equipment 10 which is determined according to the outside-provided data is displayed. Then, it goes to the step S220. On the other hand, if no new outside-provided data is received, then the information screen is not updated and it goes to the step S220.

At the step S210 as the first one, the displaying unit 57 displays the information screen representing the condition of the target equipment 10 according to the outside-provided data received from the local server 30 by the communicating unit 55. The condition of the target equipment 10 displayed in the information screen is later than the one at the real monitoring timing, and the time difference between them is at least the time required for the outside-provided data being sent from the local server 30 to the remote operating device 50.

When the outside-provided data contains the taken-photograph data of the first camera 21 and the second camera 23, for example, the taken photographs of the first camera 21 and the second camera 23 are displayed in the said information screen. In addition, when the outside-provided data contains the detected values of the sensors 25, for example, in the said information screen, the detected values of the sensors 25 are displayed as simple character information (numerical values), or the graph showing the variation of the detected values with the time.

Once it goes to the step S220, the host unit 51 determines whether a remote operation is performed on the target equipment 10. The remote operation is done by the input unit 59 operated by the user.

Then, if no remote operation is performed on the target equipment 10 (NO in the step S220), then it determines whether an end instruction for the reception displaying action is input from the input unit 59 (Step S240). Then, if no end instruction is input (NO in the step S240), then it goes to the step S210, and if there is an end instruction input (YES in the step S240), then the reception displaying action ends.

On the other hand, if it is determined that a remote operation is performed on the target equipment 10 (YES in the step S220), then a remote operation instruction for the target equipment 10 to perform the action corresponding to the remote operation is sent by the host unit 51 to the local server 30 via the communicating unit 55 (Step S230).

However, when the remote operation instruction is sent to the local server 30, the communicating data in which the managing ID of the latest outside-provided data is added to the remote operation instruction is generated, the latest outside-provided data is the information source of the condition of the target equipment 10 displayed in the information screen at the timing of the remote operation. Then, the communicating data is sent to the local server 30. The sent managing ID is the managing ID which is received from the local server 30 together with the latest outside-provided data as the said information source.

Then, again, the host unit 51 performs the actions after the step S210. The host unit 51 updates the information screen displayed on the displaying unit 57 in order that the latest condition of the target equipment 10 can be displayed, and receives the remote operation performed on the target equipment 10 and sends the corresponding remote operation instruction together with the managing ID. The sent managing ID is used to, in the local server 30, determine the user-identified condition of the target equipment 10 displayed in the information screen when the said remote operation is performed by the remote operating device 50.

Figure 4:
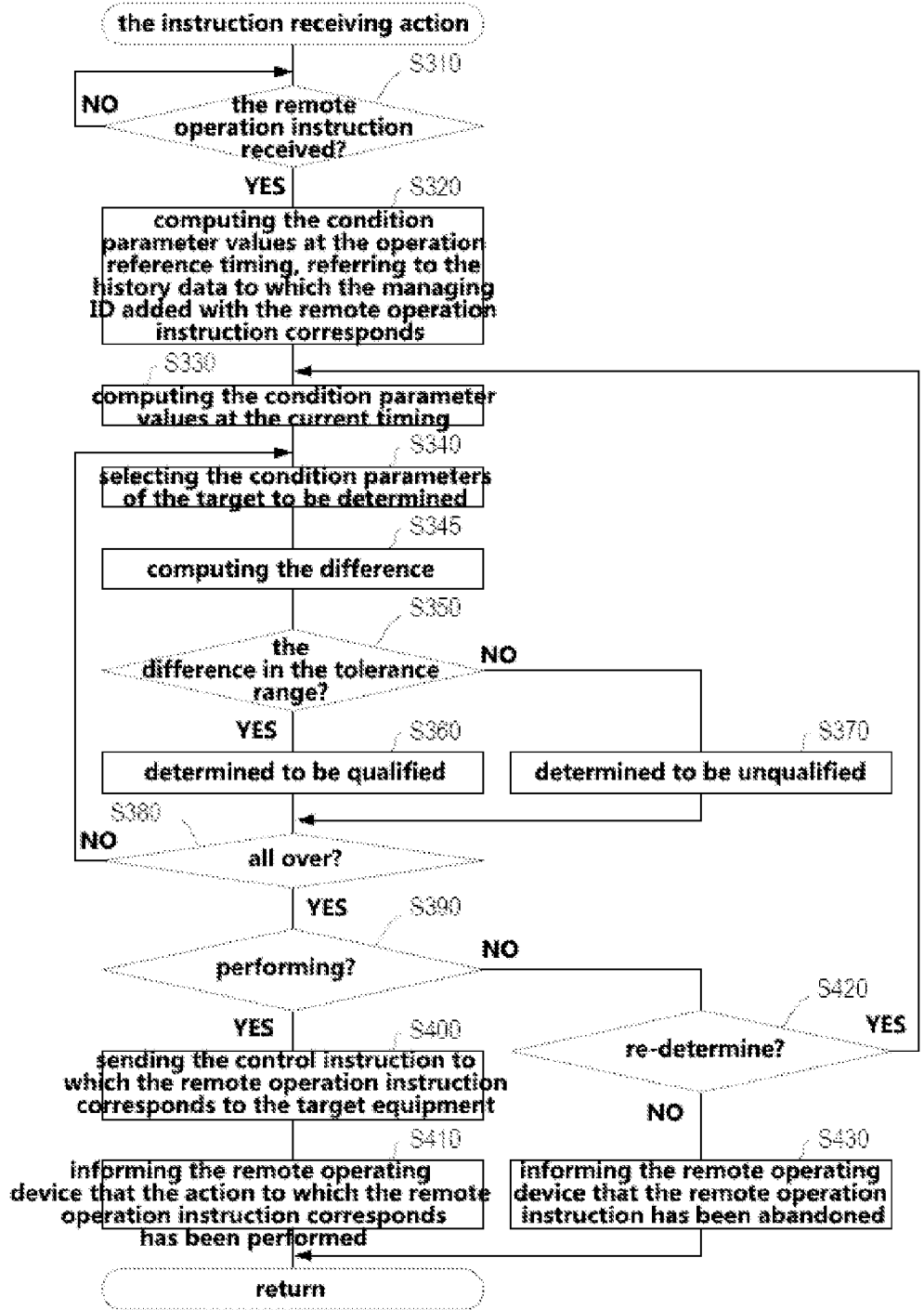
FIG. 4 is the flow chart showing the instruction receiving action performed by the host unit of the local server.

Then, the description of the details of the instruction receiving action performed by the host unit 31 of the local server 30 in order to receive the remote operation instruction will be made with reference to FIG. 4. The host unit 31 performs the instruction receiving action shown in FIG. 4 repeatedly.

Once the instruction receiving action begins, the host unit 51 is in standby condition before receiving the remote operation instruction from the remote operating device 50 (Step S310). Then, once the remote operation instruction is received (YES in the step S310), the actions following the step S320 are performed.

At the step S320, according to the managing ID added into the remote operation instruction received from the remote operating device 50, the history data stored in the storing unit 33 and associated with the managing ID is referred to. Then, the condition parameters at the monitoring timing to which the said managing ID corresponds (referred to as the operation reference timing hereinafter) are computed according to the history data. The operation reference timing corresponds to the monitoring timing of the condition of the target equipment 10 displayed in the information screen at the said remote operation timing when the remote operation instruction is sent from the remote operating device 50. In other words, the operation reference timing corresponds to the monitoring timing of the condition of the identified target equipment 10 which is presumed to be identified when the remote operation is done by the user.

The set of condition parameters, the values of which have been computed here refer to a set of parameters representing all conditions of the target equipment 10 which have effect on the executive results of the actions when the target equipment 10 is made to perform the action to which the remote operation instruction corresponds. In the set of condition parameters, the values of which have been computed here, there are not only the parameters representing the condition of the target equipment 10 identifiable from the information screen by to the user, but also the parameters representing the condition of the target equipment 10 determined by the monitoring data from the monitoring devices which is not displayed in the information screen. In addition, in these condition parameters, in addition to the parameters computed based on the history data, there are the parameters computed formally by the detected values of sensors 25 expressed by the extracted history data.

By the way, in these computed condition parameters, there are the parameters representing the condition of the target equipment 10 and the surroundings of the target equipment 10 at the instant corresponding to the operation reference timing, and the parameters representing the condition variation from the timing which is a specified period earlier than the operation reference timing, to the operation reference timing. In addition, in a set of the condition parameters, there is a parameter of 0 or 1 to represent whether there is a certain condition happened.

In addition, when computing the value according to the type of the condition parameter, not only the history data at the monitoring timing in consistent with the operation reference timing can be referred to, but also the history data at the monitoring timing before that timing can be referred to. For example, when computing the variation amount of the condition with the time, which is a condition parameter, the history data at the previous monitoring timing also can be referred to.

In more detail, as an example of the condition parameters computed according to the taken-photograph data contained in the history data, there are the parameters such as the position/speed/acceleration/posture of the target equipment 10 determined according to the taken-photograph data, or the parameters representing the variation of the position/speed/acceleration/posture and so on (such as the trace) with the time by the values or time sequence data and so on representing the trace shape of the equipment. In addition, when the taken-photograph data is the taken-photograph data of a GUI screen in which the photograph of the target equipment 10 is taken, as an example of the condition parameters, there are the parameters representing the type or the displaying position of the object displayed in the GUI screen.

In addition, when the target equipment 10 is a robot's arm, as an example of the condition parameters, there are the parameters representing the condition of the robot's arm (the position, posture, vibration magnitude of the movable part, and so on), or the parameters representing the condition of the target object handled/operated by the robot's arm (the position, posture, vibration magnitude, and so on).

At the step S320, as described above, when the target equipment 10 performs the actions based on the remote operation instruction, the values of a set of parameters, the executive results of which are changed, at the operation reference timing are computed as a set of condition parameters. A set of condition parameters to be computed can be preset by the designer of the remote operating system 1 for various types of the remote operation instructions.

Once the action of the step S320 is completed, the host unit 51 computes the values of the condition parameters at the current timing to which the condition parameters the values of which have been computed at the step S320 corresponds (Step S330). That is, the values of the condition parameters at the operation reference timing are computed at the step S320, and the current values related to these condition parameters are computed at the step S330.

At the step S330, the current values of the condition parameters can be computed referring to the latest history data stored in the storing unit 33. Alternatively, the current values of the said condition parameters can be computed by obtaining the latest monitoring data from the monitoring device group 20. As to the condition parameters the condition parameter values of which cannot be computed only referring to the latest history data, the current values of the corresponding condition parameters also can be computed referring to the monitoring data at the timing a little earlier than the current timing.

Once the action of the step S330 is completed, it goes to the step S340, and the host unit 51 selects the condition parameter as an object to be determined from the set of condition parameters the values of which have been computed at the steps S320, S330, and computes the difference between the current values of the selected condition parameters and the values of the condition parameters at the operation reference timing (Step S345). Then, determine if the difference is in the tolerance range (Step S350). If the difference is in the tolerance range (YES in the step S350), then it is determined to be qualified (Step S360), and if the difference is not in the tolerance range (NO in the step S350), then it is determined to be unqualified (Step S370). Then, it goes to the step S380.

For example, the tolerance range used in the determination standard at the step S350 can be preset according to the different types of the remote operation instructions and the different types of the condition parameters. When the condition parameters are the parameters of 0 or 1 to represent if there is the above certain condition happened, if the current values of the condition parameters of the host unit 51 are consistent with the corresponding values at the operation reference timing, then it is determined to be in the tolerance range, if not, then it is determined to be not in the tolerance range.

At the step S380, the host unit 31 determines if all the condition parameters have been selected and subject to the action of the step S350. Then, if there is any condition parameter left unselected (No in the step S380), then it goes to the step S340, and a left condition parameter is reselected. Then, the actions following the step S345 are performed.

If it is determined that all the condition parameters have been subject to the action of the step S350 (YES in the step S380), then determine whether the target equipment 10 should be controlled to perform the action to which the remote operation instruction received from the remote operating device 50 corresponds, according to the determined results of the condition parameters indicating qualified or not (Step S390).

For example, if it is determined that all the condition parameters are qualified, then it can be determined that the target equipment 10 should be controlled to perform the action to which the remote operation instructions correspond; or the target equipment 10 should be controlled to not perform the action to which the remote operation instructions correspond, even if there is only one condition parameter determined to be not qualified.

In addition, the following method can also be adopted: if the number of the condition parameters determined to be qualified among all the condition parameters is beyond a specified ratio, then determine to control the target equipment 10 to perform the action to which the remote operation instruction corresponds; or otherwise, determine to control the target equipment 10 not to perform the action to which the remote operation instruction corresponds. Alternatively, the following method for determining can also be used: mark how qualified when the determination is made at the steps S360, S370, if the total mark is larger than the reference mark, then determine to control the target equipment 10 to perform the action to which the remote operation instruction corresponds; or otherwise, determine to control the target equipment 10 not to perform the action to which the remote operation instruction corresponds.

At the step S390, if it is determined to control the target equipment 10 to perform the action to which the remote operation instruction corresponds (YES in the step S390), then it goes to the step S400, the host unit 31 inputs the control instruction to which the remote operation instruction corresponds to the target equipment 10 via the connecting interface 37, to control the target equipment 10 to perform the action to which the remote operation instruction corresponds. Further, the communicating data containing the message indicating that the action to which the remote operation instruction corresponds has been performed is sent to the remote operating device 50 via the communicating device 35 (Step S410). Then, the instruction receiving action terminates temporarily.

In addition, at the step S390, if it is determined to control the target equipment 10 not to perform the action to which the remote operation instruction corresponds (NO in the step S390), then it goes to the step S420, and the host unit 31 determines whether the re-determination regarding to the qualification is to be made. At the step S420, for example, it is determined to re-determine within the specified time after the remote operation instruction is received, and it is determined not to re-determine after the specified time after the remote operation instruction is received.

Then, if it is determined to re-determine (YES in the step S420), then it goes to the step S330, and the host unit 31 re-computes the values of corresponding condition parameters at the current timing and performs the actions following the step S340. On the other hand, if it is determined not to re-determine (NO in the step S420), then it goes to the step S430, and the host unit 31 sends the communicating data containing the message indicating the abandonment of the remote operation instruction to the remote operating device 50 via the communicating unit 35 (Step S430). Then, the instruction receiving action terminates temporarily. The message contained in the communicating data sent at the steps S410, S430 is displayed in the information screen in the remote operating device 50.

In the above, the structure of the remote operating system 1 according to the embodiment has been described, however, the following actions can be performed at the steps S320, S330 in place of the computing of the values of the condition parameters at the operation reference timing and the values of the condition parameters at the current timing. That is, the step S320 can be skipped, and at the step S330, referring to the history data from the operation reference timing to the current timing, the host unit 31 can perform the action detecting if there is variation occurred in the interested condition during the time from the operation reference timing to the current timing, or the action detecting the variation amount of the interested condition, and computing the value indicating the existence of the variation or the value of the variation amount as the condition parameter.

If this type of condition parameter is selected at the step S340, then the step S345 can be skipped, and at the step S350, it is determined if the variation amount represented by the condition parameter is in the tolerance range. Alternatively, it is determined whether the condition parameter indicates that there is no variation in the condition, and if there is no variation, then it is determined to be qualified (Step S360), and if there is variation, it is determined to be unqualified (Step S370).

Next, the description of the examples of the remote operating system 1 will be made with reference to FIGS. 5 to 10.

EXAMPLE 1

The example 1 is the remote operating system 1 in which the target equipment 10 is an in-vehicle device. As an example of the in-vehicle device which functions as a HMI (Human Machine Interface), there is the in-vehicle device for controlling the inside of the vehicle (including the device itself) according to the commands from the user. In more detail, as an example, there is the device for displaying a GUI screen and performing corresponding actions according to the operation information for the GUI screen from the user. In the remote operating system 1 of the example, the said in-vehicle device as the target equipment 10 is operated remotely by the user through the remote operating device 50, thereby the vehicle is operated remotely.

For example, the local server 30 is connected with the first camera 21 for taking photographs of the GUI screen in the in-vehicle device, the second camera 23 for taking photographs of the front of the vehicle which is carrying the in-vehicle device, and a GPS receiver and a plurality of sensors 25 such as the vehicle speed sensor and the acceleration sensor, and the history data containing the corresponding monitoring data is stored in the storing unit 33. In the remote operating device 50, the GUI screen in the in-vehicle device is displayed according to taken-photograph data of the first camera 21 contained in the outside-provided data.

When an remote operation, in which an item in the menu window Wn (referring to FIG. 5) displayed in GUI screen of the in-vehicle device in the remote operating device 50 is pressed, is done by the user, the remote operation instruction for indicating the operation for pressing the corresponding coordinates of the selected item in the GUI screen, that is, the remote operation instruction containing the coordinates information, is sent from the remote operating device 50 to the local server 30.

Figure 5:
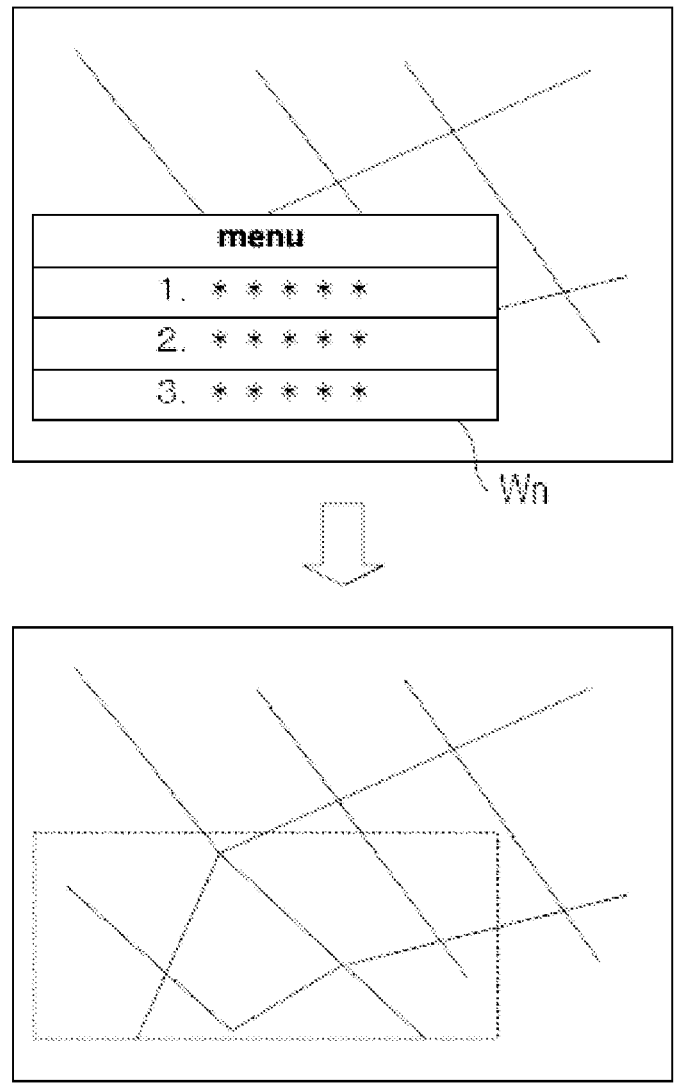
FIG. 5 is a diagram showing the variation in the GUI screen operated remotely when the target equipment is an in-vehicle device.

Here, during the time in which the remote operation instruction is sent from the remote operating device 50 to the local server 30, it is assumed that the menu window Wn displayed in the bottom of FIG. 5 disappears in the GUI screen of the in-vehicle device.

In this case, compared to the case in which the menu window Wn is displayed at the operation reference timing, at the current timing after the remote operation instruction is received, there is no menu window Wn displayed, thereby, at the step S390, it is determined by the host unit 31 of the local server 30 to control the target equipment 10 to perform the action to which the remote operation instruction corresponds.

On the other hand, in the case in which the current menu window Wn after the remote operation instruction is received is displayed in the GUI screen, at the step S390, it is determined to control the target equipment 10 to perform the action to which the remote operation instruction corresponds.

According to the example, the GUI screen is operated remotely by the user in order to operate the menu window Wn, however, when the action to which the remote operation instruction corresponds is performed by the target equipment 10, the target equipment 10 can be suppressed thus not to generate the executive results of actions which don't meet the operating aim by making the menu window Wn disappear.

EXAMPLE 2

The example 2 is the remote operating system 1 in which the target equipment 10 is a robot's arm. For example, the local server 30 is connected with the first camera 21 for taking photographs of the robot's arm, and the second camera 23 for taking photographs of the object handled by the robot's arm by taking photographs of the surroundings of the robot's arm. In addition, the local server 30 is connected with a plurality of sensors 25 for detecting the position of the movable arm part of the robot's arm, the history data containing the corresponding monitoring data is stored in the storing unit 33. For example, the history data at each monitoring timing stored in the storing unit 33 is constructed as shown in FIG. 6.

The position sensors which are the first to fourth sensors as sensors 25 are shown in FIG. 6, and if there is the movable arm part at the corresponding positions, the ON signal is output, and if there isn't the movable arm part, the OFF signal is output.

Here, if the information indicating that the movable arm part is in the first position is displayed in the information screen in the remote operating device 50, according to the outside-provided data the managing ID value of which is 2, then it is assumed that the remote operation in which the movable arm part is moved from the first position to the next position (the second position) is performed by the user on the remote operating device 50. In FIG. 6, the history data the managing ID value of which is 2 and the managing ID are represented as enclosed with thick lines.

On the other hand, the communicating data containing the corresponding remote operation instruction and the managing ID 2 is sent from the remote operating device 50 to the local server 30, and then the communicating data is received by the local server 30, assuming the latest history data when the step S330 is performed by the host unit 31 is the history data the managing ID value of which is 5. Also, in FIG. 6, the history data the managing ID value of which is 5 and the managing ID are represented as enclosed with thick lines.

It can be seen from FIG. 6, when the step S330 is performed by the host unit 31, the latest history data indicates that the movable arm part is in the same first position as at the operation reference timing. In this case, the conditions ON of the first sensor, OFF of the second sensor, OFF of the third sensor and OFF of the fourth sensor at the operation reference timing are compared with the conditions ON of the first sensor, OFF of the second sensor, OFF of the third sensor and OFF of the fourth sensor at the current timing by the host unit 31 of the local server 30, and it is determined that the difference is in the tolerance range. Then, at the step S390, it is determined to control the target equipment 10 to perform the action to which the remote operation instruction corresponds.

At the steps S320, S330, by the host unit 31, the output values of the first to fourth sensors are computed, and the condition values of the movable arm part can also be computed according to the taken photographs by the first camera 21, then the condition values of the handled target object can be further computed according to the taken photographs by the second camera 23, as the values of the condition parameter. Then, provided that the difference between the condition values determined according to these taken photographs is in the tolerance range, then it is determined to control the target equipment 10 to perform the action to which the remote operation instruction corresponds.

On the other hand, as shown in FIG. 7, the case can be considered in which the current condition represented by the history data of the managing ID 5 is different from the condition of the operation reference timing represented by the history data of the managing ID 2. It can be seen from the example shown in FIG. 7, the output of the third sensor at the current timing will become ON, even if the output of the third sensor at the operation reference timing is OFF for some reason.

In this case, the conditions ON of the first sensor, OFF of the second sensor, OFF of the third sensor and OFF of the fourth sensor at the operation reference timing are compared with the conditions ON of the first sensor, OFF of the second sensor, ON of the third sensor and OFF of the fourth sensor at the current timing by the host unit 31 of the local server 30, and it is determined that the difference is beyond the tolerance range. Then, at the step S390, it is determined to control the target equipment 10 not to perform the action to which the remote operation instruction corresponds.

In addition, the action can be considered, that is, the movable arm part is in the condition of the constant speed position-shift according to the type of the remote operation instruction, however, if the movable arm part is in the condition of the variable speed position-shift when the corresponding remote operation instruction is received, then it is determined at the step S350 that the difference is beyond the tolerance range.

It can be seen from the example shown in FIG. 8, referring to the history data involving the history data at the operation reference timing (the history data of the managing ID 2) to the history data representing the latest condition (the history data of the managing ID 7) by the temporal sequence, it can be determined that there is no condition of the constant speed position-shift happened in the movable arm part. So, the current condition can be determined by the host unit 31 of the local server 30 referring to the history data group during a certain period.

EXAMPLE 3

The example 3 is the remote operating system 1 in which the target equipment 10 is a robot's arm for handling the objects liable to scratching such as the liquid crystal panel. For example, the local server 30 is connected with the first camera 21 for taking photographs of the robot's arm, and the second camera 23 for taking photographs of the object handled by the robot's arm by taking photographs of the surroundings of the robot's arm. In addition, there are a plurality of sensors 25 connected to the local server 30, including the sensor for detecting the vibration of the movable arm part of the robot's arm, and the history data containing the corresponding monitoring data is stored in the storing unit 33.

In this case, the parameter value indicating if there is vibration happened in the past specified time is computed by the host unit 31 of the local server 30 (Step S320, Step S330), as the condition parameter.

Figure 9:
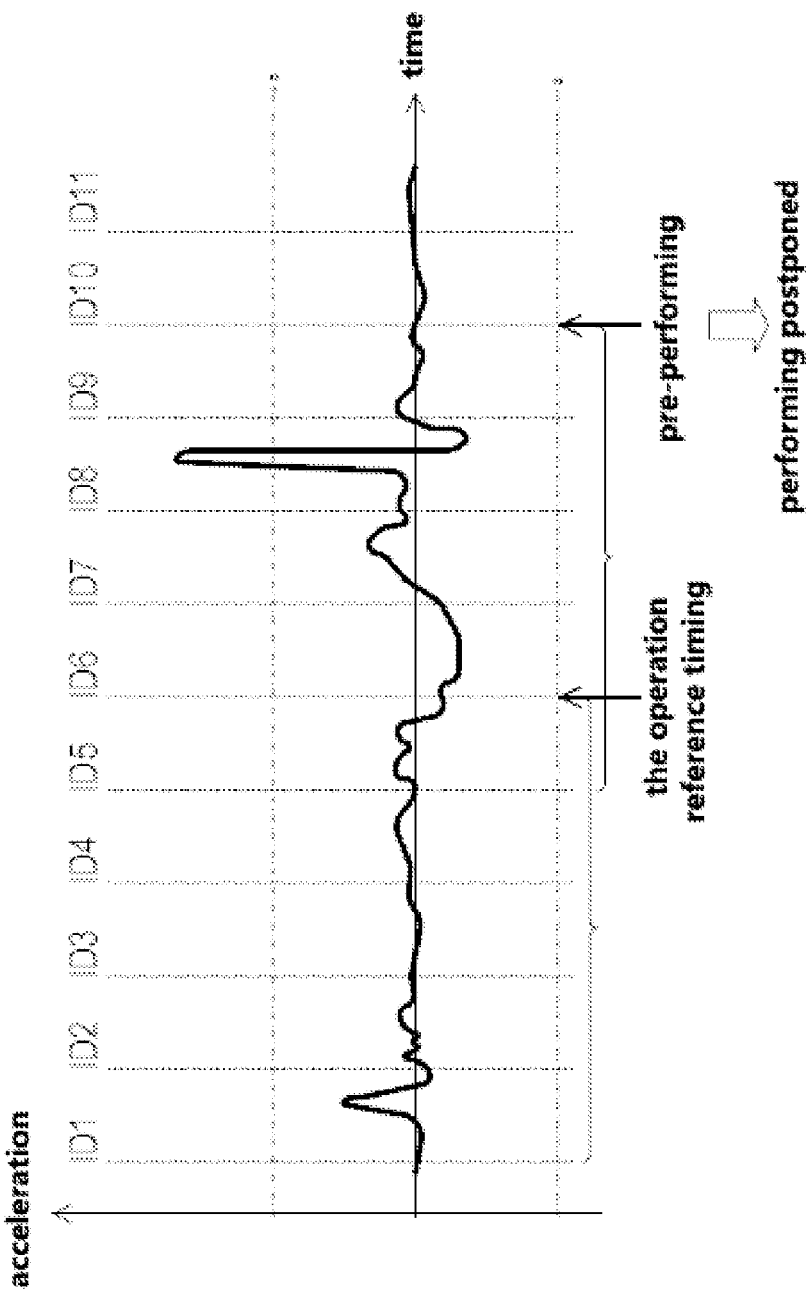
FIG. 9 is a diagram illustrating the determination whether to enable the target equipment to perform the action to which the remote operation instruction corresponds based on the vibration variation, and also a diagram showing the variation of the vibration (acceleration) with the time.

It can be seen from the example shown in FIG. 9, when a remote operation is performed on the robot's arm by the user through the remote operating device 50, the condition displayed in the information screen is, in the past 5 frames, there is no relatively large vibration the acceleration of which is greater than the reference value (represented by chain dotted lines in FIG. 9). In the example shown in FIG. 9, the operation reference timing is the timing to which the managing ID 6 corresponds. On the contrary, at the timing after the remote operation instruction is received by the local server 30, when the step S330 is performed, that is the timing to which the managing ID 10 corresponds, the condition displayed in the information screen is, in the past 5 frames, the said relatively large vibrations have happened.

In this case, at the step S390, it is determined by the host unit 31 of the local server 30 to control the target equipment 10 not to perform the action to which the remote operation instruction corresponds. Then, it is determined at the step S420 to be YES and repeat the actions of steps S330~S390, S420, and when the condition occurs in which there is no said relatively large vibration happened in the past 5 frames, the target equipment 10 is controlled to perform the action to which the remote operation instruction corresponds (Step S400).

If the local server 30 functioning as such is used, when the said relatively large vibrations have happened after the robot's arm is operated remotely by the user and before the remote operation instruction is performed, the action to which the remote operation instruction corresponds can be postponed. Therefore, during the time when the vibrations tend to occur, the damage of the handled target object caused by the robot's arm performing the action to which the remote operation instruction corresponds can be avoided, and the generation of the executive results of the actions unexpected for the user caused by the communication delay can be suppressed.

EXAMPLE 4

The example 4 is the remote operating system 1 in which the target equipment 10 is a robot for aerospace exploration or a satellite operating in the outer space. For example, the local server 30 is connected with the first camera 21 for taking photographs of the target equipment 10, and the second camera 23 for taking photographs of the object handled/operated by the target equipment 10 by taking photographs of the front of the movable arm part of the target equipment 10. In addition, there are a plurality of sensors 25 connected to the local server 30, including the sensor for detecting the surrounding illumination of the target equipment 10 and the sensor for detecting the oscillation amount of the solar panel of the target equipment 10, and the history data containing the corresponding monitoring data is stored in the storing unit 33.

Here, when the condition of the target equipment 10 based on the outside-provided data of the managing ID 1 is displayed in the information screen in the remote operating device 50, it is assumed that a remote operation is performed on the movable arm part by the user through the input unit 59 of the remote operating device 50. In FIG. 10, the history data the managing ID value of which is 1 and the managing ID are represented as enclosed with thick lines. On the other hand, the communicating data containing the corresponding remote operation instruction and the managing ID 1 is sent from the remote operating device 50 to the local server 30, and then the communicating data is received by the local server 30, assuming the latest history data when the step S330 is performed by the host unit 31 is the history data the managing ID value of which is 6. Also, in FIG. 10, the history data the managing ID value of which is 6 and the managing ID are represented as enclosed with thick lines.

In this case, the difference between the illumination X1 represented by the history data of the managing ID 1 at the operation reference timing, and the illumination X6 represented by the history data of the managing ID 6 at the current timing is computed by the host unit 31 of the local server 30, determining if the illumination difference ΔX is in the tolerance range. Then, provided that the illumination difference ΔX is in the tolerance range, at the step S390, it is determined to control the target equipment 10 to perform the action to which the remote operation instruction corresponds.

The illumination has effect on the detection errors in the position, posture and so on of the target equipment 10 detected by parsing the taken photographs by the first camera 21 and the second camera 23, or the position, posture and so on of the target object handled/operated by the movable arm part. Further, the illumination has effect on the power supply from the solar panel. Therefore, provided that the illumination difference ΔX is in the tolerance range, at the step S390, if it is determined to control the target equipment 10 to perform the action to which the remote operation instruction corresponds, then the generation of the executive results of the actions unexpected for the user caused by the illumination difference can be suppressed.

In addition, according to the oscillation amounts Y1~Y6 of the solar panel represented by the history data involving the history data at the operation reference timing of the managing ID 1 to the history data at the current timing of the managing ID 6, the posture changing rate of the solar panel is computed by the host unit 31, and if the changing rate is greater than a reference value, then it is considered the oscillation amplitude of the target equipment 10 is relatively large and it can be determined to control the target equipment 10 not to perform the action to which the remote operation instruction corresponds.

Advantageous Effects

In the above, the description of the structure and actions of the remote operating system 1 according to the embodiment has been made, according to the remote operating system 1, when the condition of the target equipment 10 identified by the user when the remote operation is performed, and the condition of the target equipment 10 when the target equipment is performing the action to which the remote operation instruction corresponds, are different from the preset condition, which is caused by the communication delay etc, the target equipment 10 is controlled not to perform the action to which the remote operation instruction corresponds, so the generation of the executive results of actions which don't meet the user's operating aim can be suppressed.

Other Embodiments

In the above embodiments, the history data is accumulated in the storing unit 33 by the local server 30, and according to the accumulated history data, it is determined by the local server 30 if the target equipment 10 is controlled to perform the action to which the remote operation instruction corresponds, however, the local server 30 may also be configured not to accumulate the history data.

For example, the monitoring data from the monitoring device group 20 required for the said determination is sent to the remote operating device 50 by the local server 30 as the outside-provided data, and the remote operating device 50 can be configured to send the corresponding monitoring data at the operation reference timing to the local server 30 when the remote operation instruction is sent. According to the embodiment, the said determination can also be done according to the monitoring data sent back by the remote operating device 50 and the latest monitoring data obtained from the monitoring device group 20, even if the history data is not stored by the local server 30.

In addition, in the above embodiment, a managing ID is given to each history data to form a history database, however, the managing ID may not be given to each history data in the history database. For example, the queue order information of the history data can be used by the local server 30 in place of the managing ID. That is, the communication data containing the outside-provided data and the queue order information of the corresponding history data can be sent to the remote operating device 50 by the local server, and the queue order information of the corresponding history data at the operation reference timing can be sent to the local server 30 by the remote operating device 50. Then, the history data at the operation reference timing can be determined according to the queue order information and referred to by the local server 30.

In addition, various information which can be used to determine the corresponding history data at the operation reference timing can be used in place of the managing ID, for example, the size information of the history data, and so on. In addition, the monitoring device group 20 and the target equipment 10 are shown in FIG. 1 as the structures of the remote operating system 1 in different devices, however, a part or all of the monitoring devices constituting the monitoring device group 20 can be built in the target equipment 10. The example in which the target equipment 10 is integral with the local server 30 may also be considered.

<Correspondence>

Finally, the correspondence between phrases will be described. The local server 30 corresponds to an example of the remote operation receiving system (device). In addition, the functions implemented by the host unit 31 performing the steps S320~S345 correspond to an example of the functions implemented by the detecting unit, and the functions implemented by performing the steps S350~S430 correspond to an example of the functions implemented by the control unit. In addition, the functions implemented by the host unit 31 performing the step S120 correspond to an example of the functions implemented by the storing unit.

The invention claimed is:

1. A remote operation receiving system, characterized by, including:
   a receiving unit for receiving a remote operation instruction for a target equipment from an external device;
   a sending unit for monitoring at least one of the target equipment and a surroundings of the target equipment, generating provided data provided to the external device indicating a condition of the target equipment according to monitoring data sent from a monitoring device for outputting the monitoring data indicating its monitoring results, and sending the provided data to the external device for displaying the condition of the target equipment based on the provided data sequentially;
   a detecting unit for detecting a condition variation in the target equipment generated between a pre-performing timing and an operation reference timing according to the monitoring data from the monitoring device, wherein the pre-performing timing is the timing before an action to which the remote operation instruction received by the receiving unit corresponds is performed by the target equipment, and the operation reference timing is the timing when the condition displayed on the external device is monitored in the monitoring device during instructing the external device to send the remote operation instruction; and
   a control unit, based on the condition variation detected by the detecting unit, controlling the target equipment not to perform the action to which the remote operation instruction corresponds when the condition variation is greater than the reference, or controlling the target equipment to perform the action to which the remote operation instruction corresponds when the condition variation is equal or less than the reference.

2. The remote operation receiving system of claim 1, characterized by,
   the remote operation receiving system includes an accumulation unit for storing the monitoring data from the monitoring device in a storing device as history data at each monitoring timing;
   the detecting unit detects the condition variation according to the history data at the each monitoring timing stored in the storing device.

3. The remote operation receiving system of claim 2, characterized by,
   the sending unit is configured to send the provided data generated based on the monitoring data to the external device together with an identification code corresponding to the monitoring timing;
   the external device is configured to, if instructing to send the remote operation instruction is performed, send the remote operation instruction corresponding to the operation to the remote operation receiving system together with a condition information source displayed at the operation, that is, an identification code of the provided data;
   the receiving unit receives the remote operation instruction and the identification code;
   the detecting unit detects the condition variation according to the history data at the each monitoring timing stored in the storing device, at the same time, according to the identification code received by the receiving unit, the history data indicating the condition of the target equipment at the operation reference timing is determined.

4. The remote operation receiving system of claim 1, characterized by,
   the monitoring device includes a camera, for taking photographs of at least one of the target equipment and the surroundings of the target equipment and outputting taken-photograph data as the monitoring data;
   the sending unit sends the taken-photograph data to the external device as the provided data.

5. The remote operation receiving system of claim 1, characterized by,
   regarding to the condition variation, if a condition difference, between the condition of the target equipment at the pre-performing timing and the condition of the target equipment at the operation reference timing, is greater than a reference, before the difference becomes to be equal or less than the reference, the target equipment is controlled, by the control unit, not to perform the action to which the remote operation instruction corresponds; and, the target equipment is controlled to perform the action to which the remote operation instruction corresponds when the said difference is equal or less than the reference.

6. The remote operation receiving system of claim 5, characterized by,
   if the state in which the difference is beyond the reference lasts for more than a specified time, the control unit abandons the remote operation instruction.

7. A remote operating system, characterized by, including:
   a remote operation receiving system of claim 1; and
   a remote operating device, as the external device, for sending the remote operation instruction to the remote operation receiving system, and displaying the condition of the target equipment according to the provided data received from the remote operation receiving system.

8. A non-transitory storage medium comprising a program, characterized by,
   enabling an information processing system of a computer to perform the following steps, wherein a remote operation instruction for a target equipment from an external device is received by the information processing system:
   a sending step for monitoring at least one of the target equipment and a surroundings of the target equipment, generating the provided data provided to the external device indicating a condition of the target equipment according to the monitoring data sent from a monitoring device for outputting the monitoring data indicating its monitoring results, and sending the provided data to the external device for displaying the condition of the target equipment based on the provided data sequentially;
   a detecting step for detecting a condition variation in the target equipment generated between a pre-performing timing and an operation reference timing according to the monitoring data from the monitoring device, wherein the pre-performing timing is a timing before an action to which the remote operation instruction corresponds is performed by the target equipment, and the operation reference timing is the timing when the condition displayed on the external device is monitored in the monitoring device during instructing the external device to send the remote operation instruction;

a control step, based on the condition variation detected by the detecting unit, controlling the target equipment not to perform the action to which the remote operation instruction corresponds when the condition variation is greater than a reference, or controlling the target equipment to perform the action to which the remote operation instruction corresponds when the condition variation is equal or less than the reference.

* * * * *